United States Patent Office 3,467,855
Patented Sept. 16, 1969

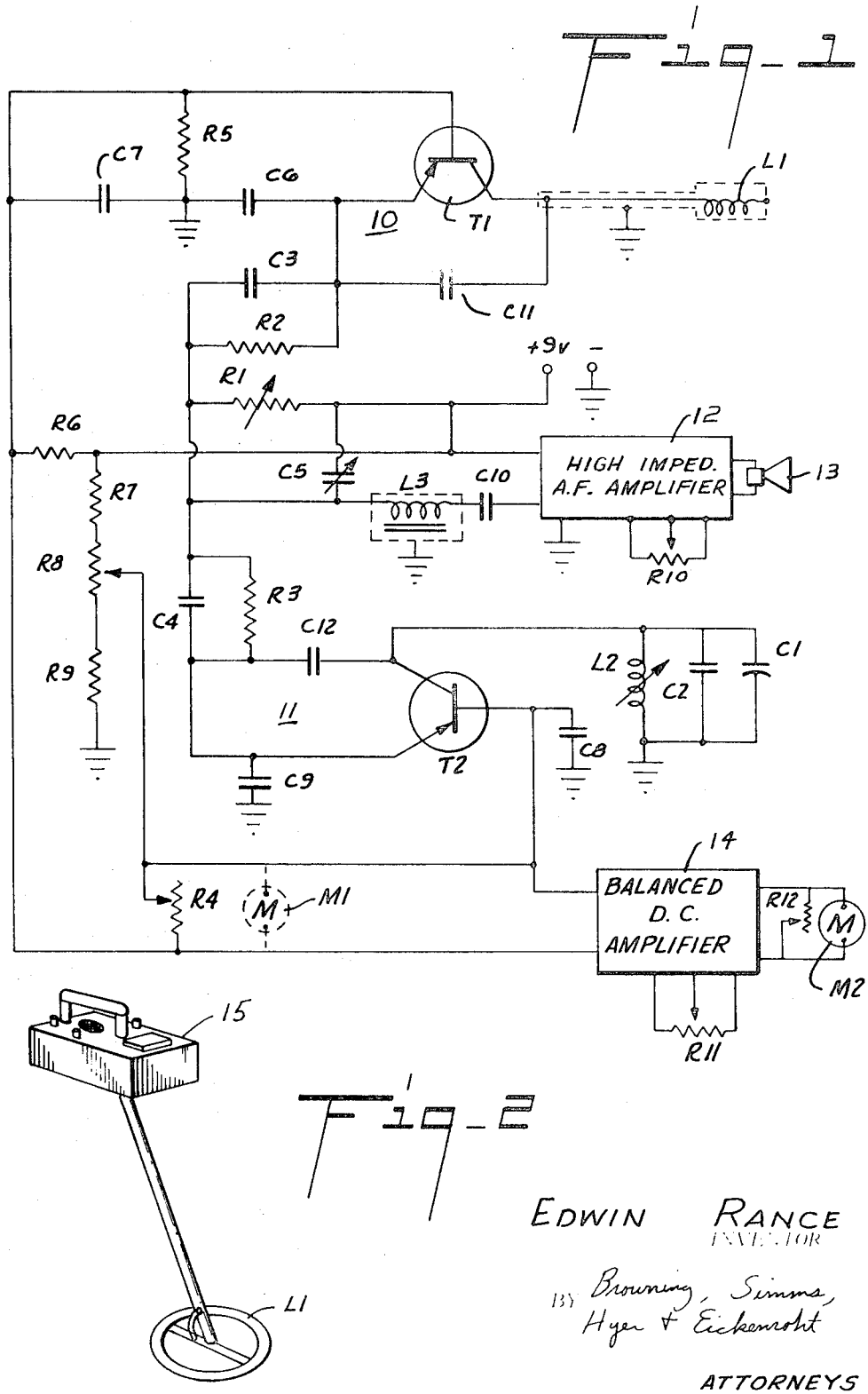

3,467,855
OBJECT DETECTOR AND METHOD FOR DISTIN-
GUISHING BETWEEN OBJECTS DETECTED IN-
CLUDING A PAIR OF RADIO FREQUENCY
OSCILLATORS
Edwin Rance, 3709 Fannin St., Houston, Tex. 77004
Filed Aug. 3, 1967, Ser. No. 658,171
Int. Cl. G01v *3/00;* G01r *33/00, 33/12*
U.S. Cl. 324—3
11 Claims

ABSTRACT OF THE DISCLOSURE

An object detector and discriminator circuit including first and second radio frequency oscillators and an inductor probe forming the tuned circuit of the first oscillator. Electrical energy radiated from the inductor probe is disturbed sufficiently when in proximity of an object to be detected, to cause a shift in the radio frequency output and the base or grid current of the first oscillator. The second oscillator is fixed at a frequency adapted to beat with the first oscillator radio frequency output to provide a distinctive audio output which varies with the change in the frequency of the first oscillator. The base or grid current of the second oscillator is compared through a voltage divider network to provide an error signal which is amplified and indicated on a meter. The error signal responds to changes in the first oscillator base current and the beat frequency when properly adjusted so that a current increase is indicated when an object having relatively good electrical conductivity is passed, and a current decrease is indicated when an object having relatively poor electrical conductivity is passed.

---

This invention relates to an object detector and discriminator circuit and, in one of its aspects, to such a circuit responding to the electrical conductivity characteristics of objects to be detected to provide two distinctive indications capable of being translated into location, size, and qualitative information about the objects.

Object or metal detectors are generally employed by treasure hunters or industrial metal locators to locate objects buried in the earth. Many such devices are available which give the relative location and, in some cases, the relative size of a buried object, but these devices provide poor discrimination of objects into quality or type. This is particularly true of metallic objects for which little information as to the type of metal object located is given. As a result, many hours may be spent by the searcher in digging up worthless objects, especially such things as tin cans and tin foil which have become abundant waste products of our society.

It is thus an object of this invention to provide an object detector and discriminator circuit which provides an indication of the location, size and quality of objects detected.

It is another object of this invention to provide such a circuit wherein discrimination between metallic and non-metallic objects is provided.

Another object of this invention is to provide such a circuit providing information whereby the type of metallic object detected may be readily determined.

Another object of this invention is to provide such a circuit wherein such determination may be made without the necessity of expensive and complex equipment, or a highly-skilled operator.

Still another object of this invention is to provide such a circuit employing relatively inexpensive, reliable and easily-obtainable components, and wherein the circuit requires little space or power consumption so that it may be readily adapted to use in a light and portable object detector.

Other and further objects of the present invention will become apparent and the invention will be best understood from the following description of an embodiment thereof, reference being had to the drawing, wherein:

FIG. 1 is a schematic diagram of a preferred form of the object detector and discriminator, and FIG. 2 is a pictoral view of the type of portable metal detector in which the present invention may be used.

In accordance with the present invention, electrical energy is radiated from an inductor adapted to be placed in a probe which is moved about close to the ground. Objects buried in the surface of the earth disturb the field of radiation and means are provided for detecting these disturbances and translating them into information which the operator can use to determine the location, size and type of object detected. A means is employed for generating the radiation of energy from the inductor at a resonant frequency.

The disturbances in the radiated energy cause a change in the resonant frequency of the radiated energy and a direct current voltage change in an element of the generating means and these changes provide two distinctive indications which are measured and compared by the operator to provide the desired information.

Referring to the drawings, wherein a preferred embodiment of the invention is shown, in FIG. 1, the field of radiated electrical energy is established by a first radio frequency oscillator 10, shown as including transistor T1 and associated components. Oscillator 10 includes an inductor L1 and capacitor C12 which provide a tuned circuit at a low radio frequency, for example, 400 kc. The inductor L1 is preferably Faraday-shielded so that it is not affected appreciably by stray capacitance. Inductor L1 may be wound to form a loop at the end of a probe, such as illustrated in FIG. 2, so that it may be moved over the surface of the earth.

Oscillator 10 generates a radio frequency signal at its fundamental frequency at the emitter of transistor T1. Any variation in the effective inductance of inductor L1, such as is caused when the probe approaches objects having certain electrical conductivity characteristics, causes a shift in this output frequency.

Also, as hereinafter more fully explained, the effective impedance of the inductor probe L1 is affected by the proximity of objects in a manner to cause a change in the base current of transistor T1. The base current of T1 provides a first direct current output which represents changes in amplitude of the base current. This output is shown as a direct current voltage at the base of T1 which develops across base resistor R5 in response to the base current of T1. The voltage is obtained from a voltage divider network including resistors R6, R7, R8 and R9 connected to a source of direct current voltage.

A means is provided which responds to the alteration of frequency at the emitter of T1 and the alteration in the transistor base current in response to disturbances in the radiated energy to provide two distinctive signals corresponding to the electrical conductivity characteristics of objects to be detected. This means preferably includes a second radio frequency oscillator 11 at a fixed frequency sufficiently close to the frequency of oscillator 10 so that a beat audio frequency output is produced when the oscillators 10 and 11 beat together. In FIG. 2, oscillator 11 includes transistor T2 and associated components, including a tuned circuit composed of inductor L2 and capacitors C1 and C2, connected to the collector of T2.

The radio frequency outputs of T1 and T2 are conducted from their respective collectors through resistors R2 and R3 and capacitors C3 and C4 to provide a beat frequency signal corresponding to the difference in the frequencies of the outputs. The beat frequency signal thus produced is passed to a variable capacitor C5 and thus is subjected to the capacitive reactance of C3, C4 and C5. The beat frequency signal is then passed through a RF choke which is preferably shielded L3 and C10 to an audio amplifier 12 which converts the beat frequency signal to an audio output tone equal to the beat frequency through a speaker 13. This amplified tone varies with the frequency of the oscillator 10 as the inductor L1 is passed by objects to provide the first distinctive indication of the presence of an object.

The base of T2 is connected to the wiper arm of R8 which forms part of the base supply voltage divider network. Base voltage for transistor T2 is thus derived through this network, and by adjustment of R8 a desired potential difference or balance between the base voltages of T1 and T2 can be established. The base voltages are a function of the base current in each transistor and this current has been found to vary slightly with the variations in frequency of oscillator 10 when certain objects are passed. When the beat frequency is low and the capacitive reactance of C5 has been adjusted to a point at which changes in frequency cause corresponding change in the reactance of the oscillator circuits, these reactance changes cause a slight change in the balance between the base currents of T1 and T2.

Thus, a means is provided for comparing the relative base voltages of T1 and T2 to generate an error signal corresponding to changes between these voltages. This means includes the voltage divider network composed of resistors R6, R7, R8 and R9 and a microampere meter M1 connected across the bases. Preferably, this meter has a zero mid-scale and the potential between the bases can be adjusted to this value by potentiometer R8. A second potentiometer, R4, is connected across the meter M1 to adjust the sensitivity of the meter.

The variation of the base currents when objects are passed is usually slight, although detectable. To aid in detection it is preferred that a conventional balanced D.C. amplifier 14 be employed for amplifying the error signal. A gain of 50 or 100 is usually sufficient. The input of the amplifier is connected to the bases of T1 and T2 and the output to a microampere or milliampere meter M2. Since the amplifier 14 and meter M2 are generally necessary to provide sufficient indications of current changes in bases of T1 and T2, the meter M1 is shown in dotted lines.

FIG. 2 shows an example of a hand-carried portable detector 15 using the circuit described above. Also, solely as an example, the following values of components are suitable for use in the circuit described (oscillator 10 tuned at approximately 400 kc.):

C1—365 mmf.; main tuner with vernier control
C2—600 mmf.; 400 v. mica
C3, C4—82 mmf.; 400 v. mica; 5% tol.
C5—880 mmf. to 2330 mmf. padder (adj. metal selectivity by meter)
C6, C9—5000 mmf; 400 v. mica; 5% tol.
C7, C8, C10—.1 mmfd.; 10 v.
C11, C12—.001 mfd.
R1—0 to 5,000 ohm linear potentiometer
R2, R3—2,100 ohms, ¼ w., 5% tol.
R4—0 to 50,000 ohms (for meter safety percent sensitivity on mainswitch)
R5, R6—10,000 ohms, ¼ w., 5% tol.
R7, R9—8,200 ohms, ¼ w.
R8—3,500 ohm pot. (adjust midscale on meter or D.C. bias into amplifier)
M1—15 microamp., 1960 ohm
T1, T2—TR-17 transistors
L2—100 microhys., 4 ohms, powdered iron core
L3—2.5 mh. RF choke peak audio output
L1—21 turns of #26 stranded, insulated (Belden 8505) wire; bunch wound to 6" dia.; close shielded with .005" thick aluminum foil or lead foil, then molded or encased in reinforced Fiberglas or plastic resin For best results, matched transistor oscillators (or tubes, if used), and associated components should be used. They should be incapsulated and insulated against thermal and humidity effects. Also, the diameter of inductor probe L1 can be varied depending on the depth and size of the objects to be located, however, better discrimination of small objects is obtained with a small inductor. A larger probe (for example, 10") would work better in detecting larger and deeper objects. Also, other frequencies other than 400 kc. may be used, and, in fact, a lower frequency would probably give better results over mineralized ground or salt water.

Capacitors C3, C4 and C5 can be omitted (and C8 or R1 made variable), but with these three capacitors used in conjunction, better selective signals are realized. The padder condenser C5 offers a relatively simple and stable means of capacitive reactance adjustment for correct selection between metals at the given beat frequency.

Also, it is not imperative to beat the oscillators if minor circuit changes are made. For example, the two radio frequency outputs could be carried to a conventional mixer-detector stage. Also, a D.C. metal selective signal can be obtained by connecting two isolating audio chokes and meter M1 between the emitters. Other circuit changes could obviously be made of this nature without detracting from the principles and operation of this invention.

In operation, oscillator 10 is tuned near the same frequency as oscillator 11 so as to cause a reactive potential balance to exist between them. In the embodiment illustrated, this balance is especially between the bases of transistors T1 and T2 and, of course, their base bias supplies, although the reactive balance may be obtained between other transistor elements (or, for example, between the control grids of vacuum tube oscillators). However, since the take-off points for the distinctive signals are from each of the identically-biased and bypassed transistor bases, there is very little oscillator circuit impairment.

Thus, when the capacitive reactance of C5 is adjusted with R8 so that a few microamperes of current is passing through meter M1, there will be a very distinct reversal of the meter M1 pointer when the inductor probe L1 moves from a poor-conducting metal and approaches a good-conducting metal, thus providing a useful indication of the type of metal passed. Of course, if the D.C. amplifier 14 and meter M2 are employed, the reversal will show on meter M2.

In tests so far conducted, best results were obtained with the two oscillators tuned to beat together to form a low-frequency audio growl or motorboating through the audio frequency amplifier and speaker.

The electrical resistance or RF impedance of such metals as iron, steel, tinfoil, etc., is greater than that of others such as silver, gold or copper. If the two similar oscillators 10 and 11 are beating together, forming a low-frequency audio pitch and the radiation field of the inductor probe L1 approaches metal or objects of high electrical resistance, eddy current or hysteresis losses occur in the radiated field. These losses cause the transistor T1 current to incease, tending to make up for the load or energy loss. The transistor T1 collector-emitter current increase causes a slightly increased voltage drop through the transistor and resistors R1 and R2, and a slight decrease in base bias current, which causes a slight base voltage increase. This base voltage increase changes the balance between the direct current signals between the bases of T1 and T2 to produce an error signal which is amplified by DC amplifier 14 and read on meter M2. Also, the resonant frequency of the inductor probe L1 will, for most metallic objects, increase to cause a change in the beat audio frequency.

When inductor probe L1 approaches a good electrical conductor, such as silver, gold or copper, a definite frequency increase at the oscillator output occurs, causing an increase in the beat frequency. However, in this case, the eddy resistance loss is relatively small and would cause only a small shift in the balance of the DC bias between the bases of T1 and T2. However, this effect is overcome by the changes in the beat frequency and the corresponding reactive changes in the frequency responsive components, and the shift caused by the meter pointer is in the opposite direction from that caused when higher-resistant metals are detected. Therefore, a distinctive indication of the lower-resistance metals is provided. Should the inductor probe L1 be swung in too close to the good-conducting metal, the increase in base current of T1 will be overcome and reversed, apparently by the loss factors mentioned with reference to the higher impedance objects.

For proper selective action on larger pieces of metal, the beat frequency should be tuned by C1 to a higher pitch. This higher frequency sharpens the distinguishing factor.

The indications of the effect on objects passed on the transistor-base currents and on the resonant frequency of the oscillator 10 are compared by the operator by visual inspection of the microammeter M2 (or M1) and careful detection of change in tone of the audio output from the speaker. The following chart is an example of typical readings taken with a detector employing the circuit of this invention. The tests were made using a Faraday-shielded 6" inductor probe and a one-stage D.C. amplifier with an approximate current gain of 50. The oscillators were tuned to about 400 kcs. The meter M2 was set at approximately midscale as a zero reference point and the oscillators were beat to give a low-frequency growl. The change in audio pitch due to change in resonant frequency of oscillation is noted as relative change from the set beat frequency.

| Item | Meter reading (microamp.) | Relative change in audio pitch |
|---|---|---|
| (A) Beer can buried 6" | −12 | Very noticeable change (increase). |
| (B) ¾" sq. tinfoil buried 1" | −12 | Radical change (increase). |
| (C) Magnetite pebbles buried 3" | −8 | Noticeable change (decrease). |
| (D) Small screw or nail on surface. | −5 | Faint change (increase). |
| (E) Rusted-out metal remains. | −3.5 | Slightly noticeable change (decrease). |
| (F) 3" iron ore buried 3" | −3 | Noticeable change. |
| (G) Spot change of earth makeup. | −2.5 | None. |
| (H) 1" steel washer buried 3". | −4 | Very noticeable change (increase). |
| (I) 10" steel plate buried 10" | −1 | Do. |
| (J) Five-cent piece buried 5". | 0 | Faint change (increase). |
| (K) Penny buried 4" | +0.2 | Slightly noticeable change (increase). |
| (L) Penny buried 2" | +1 | Noticeable change (increase). |
| (M) Silver dollar buried 4" | +1 | Do. |
| (N) Five-cent piece buried 1". | +1 | Very noticeable change (increase). |
| (O) Penny buried 1" | +2 | Do. |
| (P) Penny at 1" in air | +6 | Radical change (increase). |
| (Q) Silver Quarter at 1¾" in air. | +7 | Radical change. |
| (R) Gold ring buried 2" | +1 | Noticeable change (increase.) |

The chart illustrates that some discrimination is provided between different objects likely to be detected, especially between the non-precious and precious metals. After a period of use, and with the aid of such a chart, an operator can become quite skilled in recognizing the meter readings and audio changes of the different objects passed by the probe. Also, non-metallic land mines and explosives could be detected by this circuit. Of course, more sophisticated equipment could be used to provide a direct reading of the beat frequency, with some sacrifice of the portability of the detector. Experience has shown, however, that the method described with reference to the chart is satisfactory.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. An object detector and discriminator circuit responding to the electrical conductivity characteristics of objects to be detected to provide two distinctive indications capable of being translated in location, size and qualitative information about said objects, comprising, in combination: means establishing a field of radiated radio frequency energy including an inductor radiating such energy and adapted to be passed in proximity to an object to be detected, said means having a radio frequency output and a direct current output each altered by disturbances in said radiated field when the inductor is in proximity to such object, and means responding to the alteration of said radio frequency output to provide a first distinctive signal corresponding thereto, and responding to the alteration of said direct current output to provide a second distinctive signal corresponding thereto, said last-mentioned means includes means for generating a second radio frequency output at a substantially constant frequency and a second direct current output at substantially constant amplitude; means for beating said radio frequency outputs to produce an alternating current signal at a beat frequency varying in response to the frequency changes in said first radio frequency signal caused by said disturbances to provide one of said distinctive indications; and means for comparing said direct current outputs to produce an error signal, the amplitude of said error signal varying in response to the amplitude changes in said first direct current output caused by said disturbances to provide the other distinctive indication.

2. The detector of claim 1 wherein said first mentioned means and said second radio frequency output generating means are first and second radio frequency oscillators, respectively, and wherein said mixing and comparing means are coupled together so that the amplitude of said error signal responds to the frequency of said beat frequency so as to cause a shift in said error signal current in one direction when objects having good electrical conductivity are passed, and to cause a shift in said error signal current in the opposite direction when objects having poor electrical conductivity characteristics are passed.

3. The circuit of claim 1 further including means for converting said first distinctive indication to an audible indication, and the second distinctive indication to a visual indication.

4. The circuit of claim 1 further including an audio frequency amplifier for amplifying said alternating current signal, and wherein said first distinctive indication is an audible output, and including a D.C. amplifier for amplifying said error signal, and a meter for providing a visual indication of said second distinctive indication.

5. The circuit of claim 2 wherein said oscillators are transistor oscillators, each having a base element and a base resistor through which said direct current outputs are respectively developed, and further including a voltage divider coupling said bases to provide said error signal in response to variations in the base current of either oscillator.

6. A method of determining the relative size, location and quality of a buried object, comprising the steps of: radiating electrical energy from an inductor probe; passing said inductor probe in proximity to objects to be detected whereby the electrical conductivity of said object disturbs said radiated energy; utilizing the disturbance in said radiated energy to produce an alternating current signal of frequency varying in response to said disturbance, and to produce a direct current voltage of intensity varying in response to said disturbance; generating a substantially constant alternating current signal adaptable to beat with said variable alternating current signal at a beat frequency to produce a beat frequency signal, generating a substantially constant direct current voltage, comparing said direct current voltages to produce an error voltage, and measuring and comparing said beat frequency and error voltage, whereby the relative frequency of the beat frequency signal and intensity of the error voltage provides information of the relative size, location and quality of said object.

7. The method of claim 6 wherein said signals and voltages are generated by transistor oscillators beating together to produce said beat frequency and having their bases coupled together through a voltage divider network to produce said error voltage, and further including the steps of balancing said alternating current signals to substantially the same frequency to produce a low-beat frequency, and balancing said base currents to produce substantially zero error voltage whereby the presence of an object having poor electrical conductivity characteristics will cause a shift in said error signal current in one direction and the presence of an object having good electrical conductivity characteristics will cause a shift in said error signal current in the opposite direction.

8. The method of claim 6 further including the step of establishing a reactive potential balance responsive to said beat frequency between the bases of said transistors.

9. An object detector and discriminator circuit responding to the electrical conductivity characteristics of objects to be detected to provide two distinctive indications capable of being translated in location, size and qualitative information about said objects, comprising, in combination: radiating means establishing a field of radiated alternating current energy including an inductor radiating such energy and adapted to be passed in proximity to an object to be detected, said radiating means having an alternating current output and a direct current output each altered by disturbances in said radiated field when the inductor is in proximity to such object; first distinctive signal generating means responding to the alterations of said alternating current output to provide a first distinctive signal corresponding thereto; and second distinctive signal generating means including an electrically reactive component connected to said first distinctive signal generating means and responding to the alteration of said direct current output and the electrical reactance of said component in response to said first distinctive signal to provide a second distinctive signal having one value in response to said alteration of said direct current output when said objects have relatively poor electrical conducting characteristics, and another value readily distinguishable from said one value in response to the electrical reaction between said first distinctive signal and said direct current output when said object has relatively good electrical conducting characteristics.

10. The detector of claim 9 wherein an electrical current meter is connected between said direct current output and said second distinctive signal generating means to provide said second distinctive signal, the deflection of said meter being in one direction to provide said one value, and in the opposite direction to provide said another value.

11. A method of determining the relative size, location and quality of a buried object, comprising the steps of: radiating electrical energy from an inductor probe; passing said inductor probe in proximity to objects to be detected whereby the electrical conductivity of said object disturbs said radiated energy; utilizing the disturbance in said radiated energy to produce an alternating current signal of frequency varying in response to said disturbance, and to produce a direct current signal of intensity varying in response to said disturbance, establishing an electrical reaction, to said alternating current signal to generate a reactive signal; combining said reactive signal and said direct current signal; and measuring and comparing said alternating current signal and said combined direct current signal and reactive signal whereby the relative frequency of the alternating current signal and intensity of said combined signal provides information of the relative size, location and quality of said object.

References Cited

UNITED STATES PATENTS

| | | | |
|---|---|---|---|
| 2,167,630 | 8/1939 | Bazzoni et al. | 324—5 |
| 2,271,951 | 2/1942 | Pearson et al. | 324—5 |
| 2,376,610 | 5/1945 | Millington | 324—5 |
| 2,422,742 | 6/1947 | Odessey. | |
| 2,442,805 | 6/1948 | Gilson | 324—3 XR |
| 2,581,394 | 1/1952 | Dinger. | |
| 3,281,672 | 10/1966 | Kuroda | 324—51 |
| 3,355,658 | 11/1967 | Gardiner | 324—3 |

GERARD R. STRECKER, Primary Examiner

U.S. Cl. X.R.

324—41